(12) United States Patent
Dery et al.

(10) Patent No.: US 8,416,094 B2
(45) Date of Patent: Apr. 9, 2013

(54) CIRCUIT BOARD INTEGRATED MOTION SENSOR

(75) Inventors: Normand Dery, Quebec (CA); Minas Minassian, Vista, CA (US)

(73) Assignee: DEI Headquarters, Inc., Vista, CA (US)

( * ) Notice: Subject to any disclaimer, the term of this patent is extended or adjusted under 35 U.S.C. 154(b) by 416 days.

(21) Appl. No.: 12/807,023

(22) Filed: Aug. 26, 2010

(65) Prior Publication Data

US 2012/0050057 A1    Mar. 1, 2012

(51) Int. Cl.
*G08B 21/00* (2006.01)

(52) U.S. Cl.
USPC .................. 340/669; 73/514.12; 200/61.52

(58) Field of Classification Search .................. 340/669, 340/539.12, 573.1, 573.7, 566, 459, 689; 361/600, 700, 748, 605, 652, 650, 714, 717–720, 361/736; 200/61.11, 176, 11 DA, 61.52; 73/514.06, 514.09, 514.12
See application file for complete search history.

(56) References Cited

U.S. PATENT DOCUMENTS

| | | | | |
|---|---|---|---|---|
| 3,742,478 A | * | 6/1973 | Johnson | 340/539.1 |
| 4,101,093 A | * | 7/1978 | Colasanti et al. | 242/384.5 |
| 4,196,492 A | * | 4/1980 | Johnson et al. | 15/320 |
| 4,584,569 A | * | 4/1986 | Lopez et al. | 340/566 |
| 4,980,575 A | * | 12/1990 | Schenkel | 307/121 |
| 6,087,963 A | * | 7/2000 | Kobayashi et al. | 340/928 |
| 6,339,199 B1 | * | 1/2002 | Chou et al. | 200/61.52 |
| 6,377,166 B1 | * | 4/2002 | Cauchi | 340/429 |

* cited by examiner

*Primary Examiner* — Brian Zimmerman
*Assistant Examiner* — Bhavin M Patel
(74) *Attorney, Agent, or Firm* — K C Bean, Esq.

(57) ABSTRACT

A motion sensor capable of detecting the direction of motion in three dimensions is disclosed. The motion sensor can be built into a printed circuit board allowing for simple and cost effective manufacturing. The motions sensor is designed to utilize a through hole in a printed circuit board, which is capped by on each side by housings creating a cavity where a spherical metal ball can move in three dimensions. This interior surface of the through hole and the housings have conductive element that when in contact with the spherical metal ball close a circuit creating an electrical signal indicative of direction.

6 Claims, 5 Drawing Sheets

CIRCUIT BOARD INTEGRATED MOTION SENSOR

FIELD OF THE INVENTION

The present invention relates generally to motion sensors, and more particularly, to a sensor that detects motion in multiple dimensions and that can be integrated with a printed circuit board.

BACKGROUND

Many types of sensors are known and used in a broad variety of industrial and consumer product applications. Motion sensors are used for detecting, tracking and signaling the motion of an object, preferably detecting the motion in different dimensions of space. There are a number of designs that have been implemented, for example the use of a mounted pendulum, mercury switch, Hall effect detection, and the use of an electrically conductive ball within a housing. See U.S. Pat. Nos. 4,101,093; 4,196,492; 4,584,569; 6,087,936. Pendulum type systems have a number of shortcomings. Primarily, a pendulum system requires a steady surface for mounting and calibration. Additionally, Mercury tilt switches have fallen into disfavor because of environmental concern. Hall effect sensors can be complicated in design and expensive to manufacturing. Additionally, many of the prior art motion sensors are of a large size making it necessary to operate as a separate component from the product it is used with, requiring the need to send a motion signal from the sensor to another device in order for the motion signal to be detected.

Motion sensors designs have also been conceived that can be mounted on a printed circuit board. For example U.S. Pat. No. 3,742,478 discloses a motion sensitive switch, which includes a housing mounted on a circuit board and a steel ball positioned under the housing and rolling freely over three separate circuits traced on the surface of the printed circuit board. As the steel ball rolls over the circuits it makes and breaks the circuits, triggering an alarm event. There is a limitation in this type of design in that it can be overly sensitive to vibration causing undesirable triggering of a motion event, such as a concussion from a door knock, passing vehicle, or heavy construction work. Additionally, the sensor cannot provide any indication of the direction of movement of the sensor.

U.S. Pat. No. 6,339,199, issue to Chou, discloses a tilt sensor that is mounted to the surface of a printed circuit board. A central electrical contact on the surface of the printed circuit board defines a rolling area where a conductive ball may roll. There is an electrically conductive housing that encloses the conductive ball over the central contact area. The housing is also associated with a second contact area. When the sensor is tilted the ball will roll and make contact with the interior surface of the housing and the central contact area, closing a circuit and triggering a motion signal. The Chou design is limited in that it only detects motion itself, and it does not provide any indication of directionality of movement in three dimensional spaces.

U.S. Pat. No. 4,980,575, issued to Schenkel, discloses a motion sensor configuration with a first and second conductive housing. Each conductive housing contains a metal ball and is coupled together by an insulative material. The insulative material has passage that allows movement of the metal ball between each conductive housing, such that when movement occurs the metal balls will shift to make contact with the surface of the other metal ball which is in contact with the other housing elements and closing a circuit between the first and second housings. The Schenkel design is limited in that it can only detected motion in a single plane of movement. It is further limited in that the design is complicated, requiring a number of sensor components. Further, it is difficult to manufacture and expensive to build.

Therefore, there remains a need for a motion sensor that can detect motions in three dimensions, is easily manufactured at low cost and that does not required to be mounted on a platform or special apparatus.

SUMMARY

The present invention provides for small form factor motion sensor that can be integrated with a printed circuit board at low cost. The motion sensor is capable of detecting motion in three dimensions of space, and signaling the direction of motion.

A printed circuit board has a through hole, where the through hole is conductively plated on its interior surface and has a trace extending from the conductive interior surface to a micro controller. A housing is mounted over the top and bottom of the printed circuit board to cover top and bottom opening of the through hole. Each housing is hemispheric or dome shaped and may be made of a conductive or non-conductive material, depending on the embodiment that is utilized. Each housing is mounted to the printed circuit board using two prongs, each prong extending from the peripheral edge of the housing on opposite side from one another and inserted into the body of the PCB for attachment or solder on both sides of the printed circuit board. Each housing is placed over conductive trace elements printed on each side of the printed circuit board. An electrically conductive sphere, such as a steel or copper ball, is enclosed within the cavity of the through hole between two housings. The conductive sphere is of a size such that the sphere freely moves across the printed circuit board through hole and between the housings. Each housing may have electrical traces on the interior surface of the housing. When the steel ball moves within the cavity formed by each housing, it makes and breaks the electrical contact between the housing traces and the plated through hole. Direction can be determined by evaluating which trace surface on the interior of the housing has been contacted by the steel ball and closing the circuit.

Another embodiment of the invention provides for a motion sensor in which it is not necessary to determine the direction of motion, but rather only that motion itself has occurred. In this embodiment, a printed circuit board has a through hole, where the through hole is conductively plated on its interior surface and has a trace extending from the conductive interior surface to a micro controller or another circuit. A conductive housing is mounted over the top and bottom of the printed circuit board to cover the top and bottom opening of the through hole. Each conductive housing is hemispheric or dome shaped and is made of a conductive material. Each conductive housing is mounted to the printed circuit board using two prongs, each prong extending from the peripheral edge of the housing on opposite side from one another and inserted into the body of the printed circuit board for attachment or solder on both sides of the printed circuit board. Each conductive housing is placed over conductive trace elements printed on each side of the printed circuit board. An electrically conductive sphere, such as a steel ball, is enclosed within the cavity of the through hole between two housings. The conductive sphere is of a size such that the sphere freely moves across the printed circuit board through hole and between the housings. When the steel ball moves within the cavity formed by each housing and the interior of the through hole, it makes and breaks the electrical contact between the housing traces and the plated through hole. Direction cannot be determined because only a single circuit is closed between the surface on the interior of the through hole of the printed circuit board and the conductive housing.

These and other features and aspects of the embodiments of the invention will be better understood with reference to the following description, drawings, and appended claims.

DETAILED DESCRIPTION OF THE EMBODIMENTS

Reference will now be made in detail to several embodiments of the invention that are illustrated in the accompanying drawings. Wherever possible, same or similar reference numerals are used in the drawings and the description to refer to the same or like parts. The drawings are in a simplified form and are not to precise scale. For purposes of convenience and clarity only, directional terms, such as, top, bottom, left, right, up, down, over, above, below, beneath, rear, and front, may be used with respect to the accompanying drawings. These and similar directional terms should not be construed to limit the scope of the invention in any manner. Furthermore, in descriptions and in claims, "couple," "connect," and similar words with their inflectional morphemes do not necessarily import an immediate or direct connection, but include connections through mediate elements within their meanings.

Figure 1:
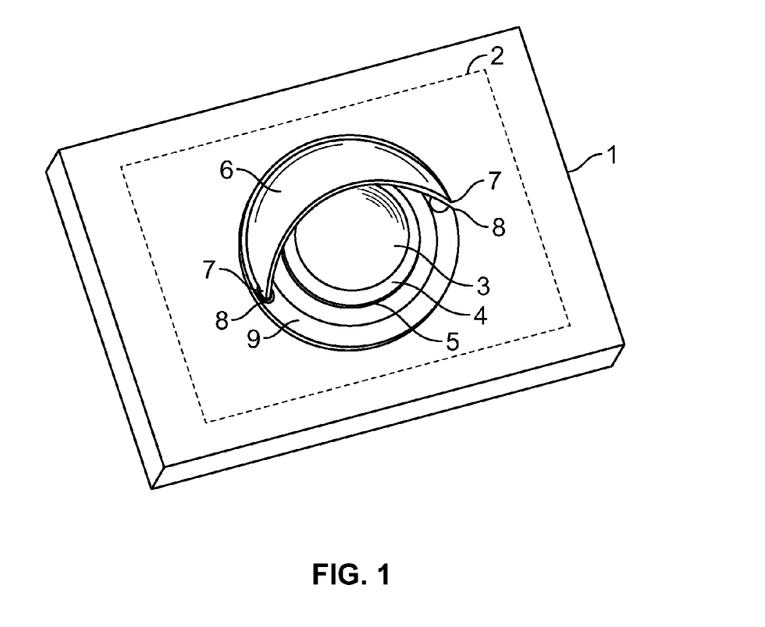
FIG. 1 is a sectional view of the circuit board integrated motions sensor.

FIG. 1 is a top side cut away view of a printed circuit board (1) with an integrated motion sensor (2) capable of detecting motion in a single dimension. FIG. 1 represents the top half of the integrated motion sensor (2) located on the top half of a printed circuit board (1). The bottom half of the integrated motion sensor is a mirror image of the top half and is located on the opposite bottom side of the printed circuit board (1). The motion sensor has a metal ball (3) within a through hole (4) of the printed circuit board (1). The through hole's (4) interior surface is plated with a conductive material (5). A housing (6) covers a second plated areas (7) and extends over the top side opening of the through hole (4) and is mounted to the printed circuit board (1) by prongs (7) on each side of the housing (6), which are inserted or soldered into mounting holes (8) on the printed circuit board (1).

Figure 2:
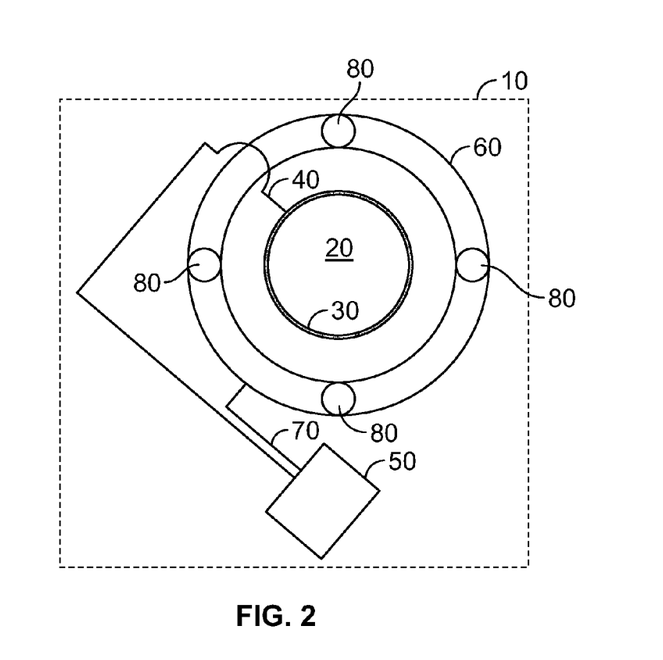
FIG. 2 shows a top or bottom view diagram of the embodiment of the circuit board integrated motion sensor with single dimension detection capability.

With reference to FIG. 2, the surface of a printed circuit board (10) has a through hole (20), where the through hole (20) is conductively plated on its interior surface (30) and has a trace (40) extending from the conductive interior surface (30) to a micro controller (50). A conductive material (60) is plated around the circumference of the through hole (20) at a minimal distance sufficient to maintain electrical isolation between a plated area (60) and the through hole plating (30). A second trace (70) extends from the plated area (60) to the microcontroller (50). There is insertion holes (80) drilled through the printed circuit board (10) at locations around the plated area (60).

Figure 3A:
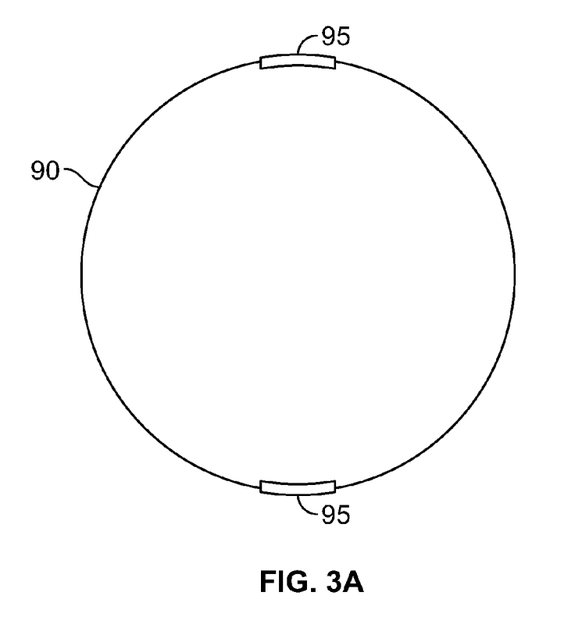
FIG. 3a shows a top view diagram of the housing of the circuit board integrated motion sensor with single dimension capability.
Figure 3B:
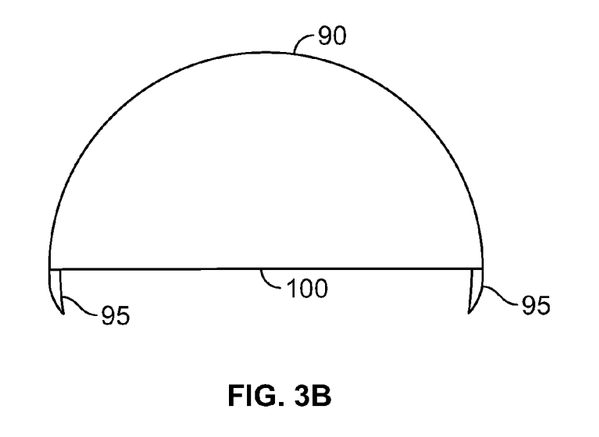
FIG. 3b shows a profile view diagram of the housing of the circuit board integrated motion sensor.

FIGS. 3a and 3b, show a housing (90). Two housings (90) are used in the motion sensor of the current invention, one on the top side of the printed circuit board and one on the bottom side. The housing (90) is generally hemispheric or dome shaped and may be made of a conductive or non-conductive material, depending on the embodiment that is utilized. In the current embodiment it is contemplated that the materials used to make the housing (90) is brass, stamped from 0.009" thick sheet brass. The housing has two prongs (95), which extent beyond the peripheral edge of the open side (100) along the diameter of the housing (90), and are of a length sufficient for mounting on the printed circuit board.

Figure 4A:
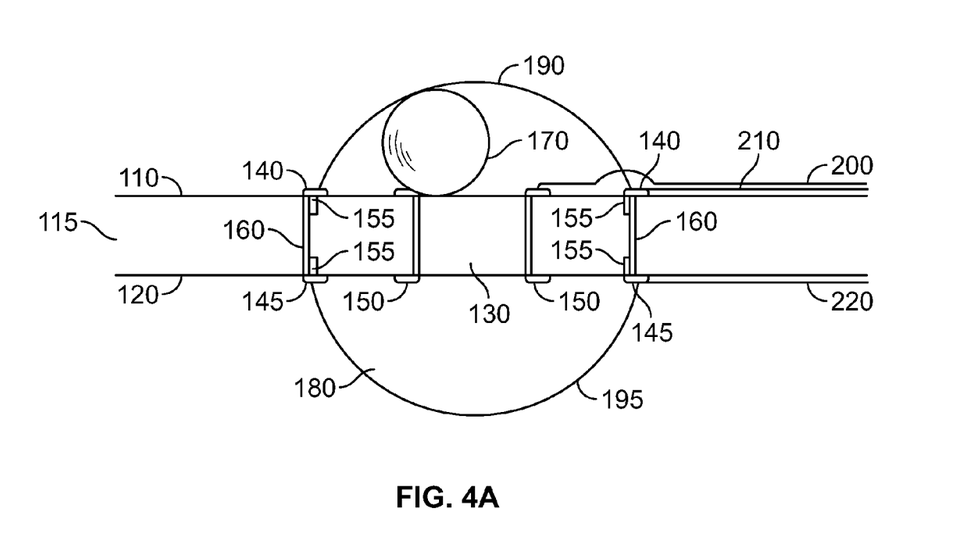
FIGS. 4a and 4b show sectional views of an embodiment of the circuit board integrated motion sensor.
Figure 4B:
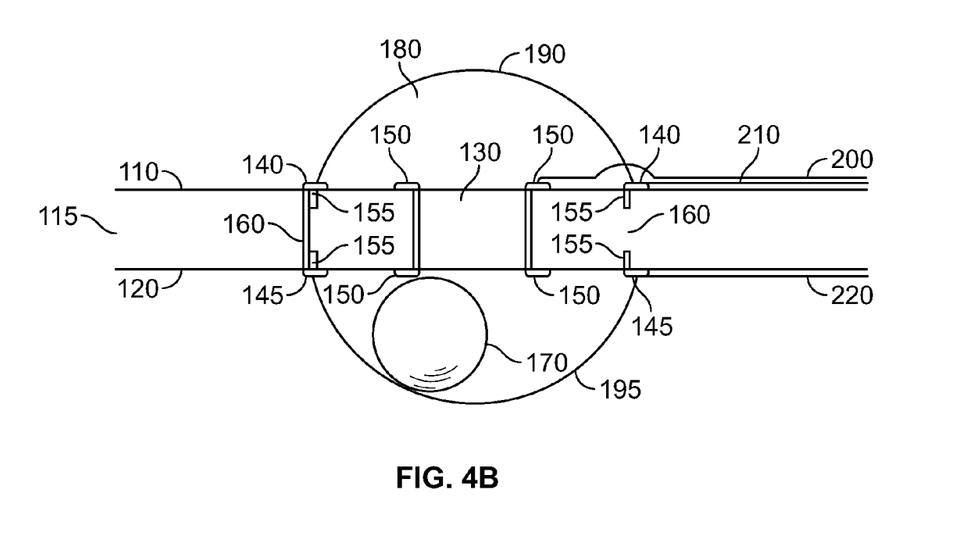

FIGS. 4a and 4b show a top housing (190) and a bottom housing (195) mounted over the top side (110) and bottom side (120) of a printed circuit board (115) and covering the top and bottom opening of the through hole (130). The top housing (190) and bottom housing (195) are mounted over a plated conductive trace areas (140) and (145) on each of the top (110) and bottom side (120) respectively of the printed circuit board (115). The trace areas (140) and (145) are printed around the circumference of the through hole (130) at a distance that allows electrical isolation from the plated area (150) on the interior surface of the through hole (130). The top housing (190) and bottom housing (195) are mounted to the printed circuit board (115) over the plated conducted trace area (140) and (145) respectively using two prongs (155), each prong (155) extending from the peripheral edge of the top housing (190) and bottom housing (195) respectively, and are inserted into the body of the printed circuit board (115) through insertion holes (160) for attachment or solder on both sides of the printed circuit board. An electrically conductive trace (200) extends from the top plated conducted trace area (150) on the top side (110) of the printed circuit board (115), a second trace extends from the bottom plated conducted trace area (145) on the bottom side (120) of the printed circuit board (115) to a micro controller (not show). If it is desirable to detect motion in more than a single dimension, a third trace can be included, which extends from the electrically plated interior surface of the through hole (150) to a micro controller (not shown).

An electrically conductive sphere (170), such as a steel or copper ball, is enclosed within the cavity (180) contained within the through hole (130) and between the top housing (190) and bottom housing (195). It will be understood by those in the art that any electrically conductive sphere (170) may be used and it does not have to be a steel ball, but it can be made of any material capable of conducting an electrical charge. The current embodiment contemplates a standard size copper ball (1/16" diameter). The conductive sphere (170) is of a size such that it freely moves across the through hole (130) and between the top housing (190) and bottom housing (195) and can occupy any space within the cavity (180) depending on the motion vectors exerted on the motion sensor.

It is preferable that all component of the present motion sensor that are in contact with the interior cavity (180) are covered with gold plating or other non-oxidizing material to prevent a build up over time of oxidation on the components. The gold plating prevents oxidation and extends the life and sensitivity of the sensor over time. Additionally, the entire motion sensor assembly may be sealed with a special high viscosity sealant to prevent contaminates from entering any gaps.

In the present embodiment, when motion is exerted on the printed circuit board, such as in a vertical plane, and the conductive ball (170) is in the bottom housing (195), the conductive ball (170) moves in the direction opposite of the vector of motion. When the conductive ball (170) comes into contact with the conductive surface of the bottom housing (195) and the conductively plated area (150) of the interior surface of the through hole (130), a circuit closes and opened along the trace leads (200) and (210) and sending a signal to the micro controller (not shown) indicative of the direction of motion in one plain. An active electronic circuit detects these transitional closures and openings and can use them to trigger other electronic subsystems used for many different motion sensing applications.

Figure 5:
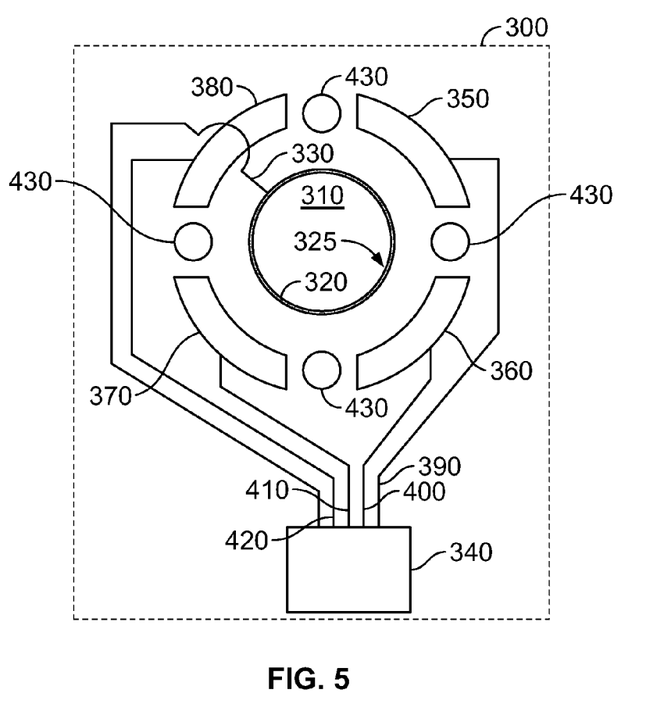
FIG. 5 shows a top or bottom view diagram of an embodiment of the circuit board integrated motion sensor capable of detecting motion in three dimensions.

In many applications, it is preferable to detect motion in multiple axis of movement. In the preferred embodiment, motion can be detected in the x, y, and z axis. FIG. 5 shows a top down view of the printed circuit board configuration of the preferred embodiment. It should be appreciated that the bottom side of the printed circuit board (300) will be a mirror image of the top side represented in FIG. 5. In applications that require particularly sensitive direction detection, multiple sensors can be mounted on the PCB in both the horizontal and vertical axis of the PCB and provide even greater directional sensitivity.

In FIG. 5, a printed circuit board (300) is show with a through hole (310), where the through hole (310) is conductively plated on its upper interior surface (320), and its lower interior surface (325), with a layer of insolative material (not shown) between the upper interior surface (320) and lower interior surface (325), and with traces (330) extending from the conductive upper interior surface (320) and lower interior surface (325) to a micro controller (340). The trace for the bottom interior surface is not shown.

A conductive material is plated at four quadrants, quadrant one (350), quadrant two (360), quadrant three (370) and quadrant four (380), each around the circumference of the through hole (310) at each respective quadrant and at a minimal distance sufficient to maintain the electrical isolation between each respective quadrant plated area (350), (360), (370) and (380), and the upper through hole plating (320) and bottom through hole plating (325). Traces (390), (400), (410), and (420) extend from each respective quadrant plated area (350), (360), (370), and (380) to a microcontroller (340). There are insertion holes (430) drilled through the printed circuit board (300) at locations between each respective quadrant plated area (350), (360), (370), and (380).

Figure 6:
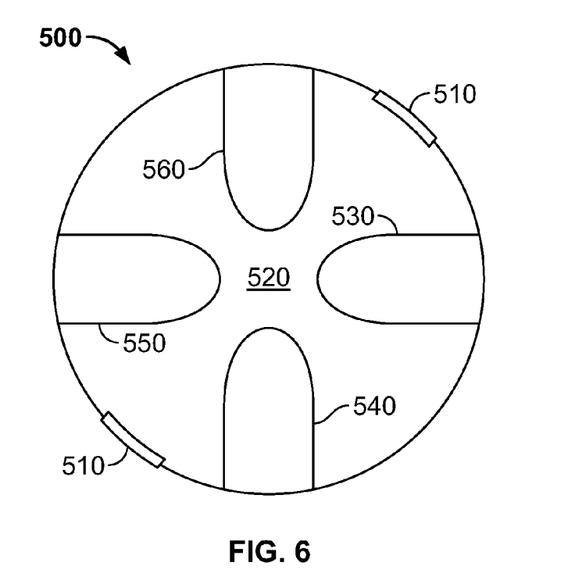
FIG. 6 shows a bottom view of the bottom view of the housing for the circuit board integrated motion sensor capable of detecting motion in three dimensions.

FIGS. 6 and 3b, show a housing (500). Two housings (500) are used in the motion sensor of the preferred embodiment of the current invention, one on the top side of the printed circuit board and one on the bottom side. The housing (500) is generally hemispheric or dome shaped, and in this embodiment, is made of a non-conductive material. In the current embodiment, it is contemplated that the material used to make the housing (500) is plastic or ceramic, pressed or molded from 0.009" thick sheets. The housing (500) has two prongs (510), which extent beyond the peripheral edge of the open side (100) along the diameter of the housing (500), and are of a length sufficient for mounting on the printed circuit board. Other means of mounting circuit board components are well know and can also be used.

FIG. 6 shows the interior surface (520) of the housing (500). The interior surface (520) is plated with electrically conductive materials in four quadrants, quadrant one (530), quadrant two (540), quadrant three (550), and quadrant four (560). It will also be appreciated by one skilled in the art that etching, lithography, or other surface coating techniques can also be used in the manufacture of the housing with appropriate conductive surface areas. It should also be appreciated that by increasing the divisions of the conductive material within the interior surface of the housing (500), one can also increase the resolution of direction indication provided by the current motion sensor. For example, the current embodiment discloses four quadrants of conductive surface; if eight quadrants are implemented, then you will double the directional resolution.

Figure 7A:
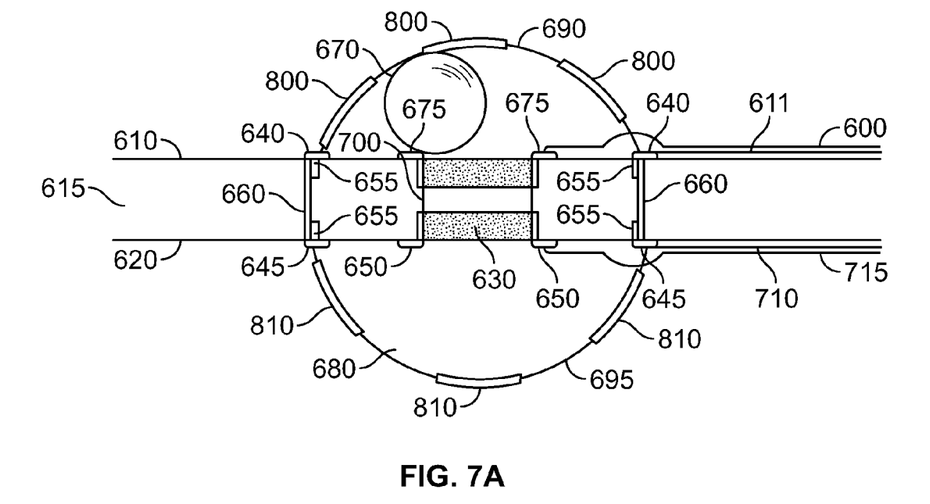
FIGS. 7a and 7b show sectional views of an embodiment of the circuit board integrated motion sensor capable of detecting motion in three dimensions.
Figure 7B:
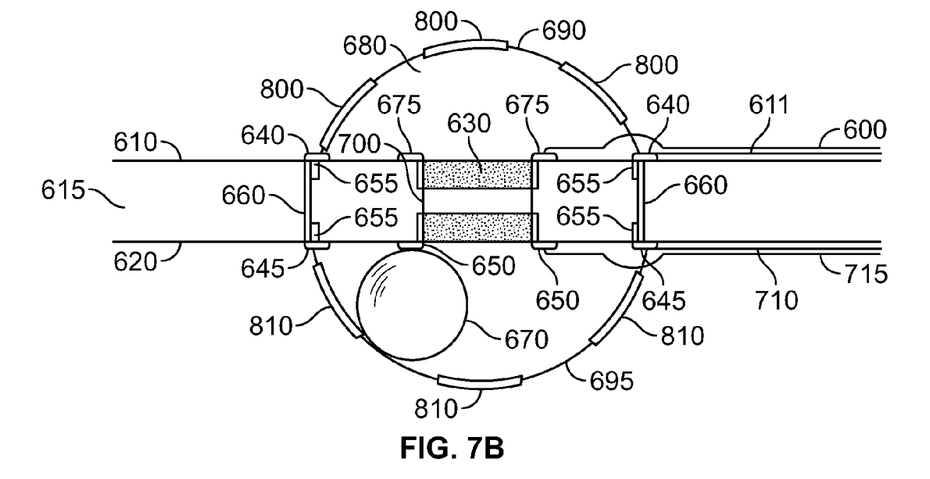

FIGS. 7a and 7b show sectional view of a printed circuit board (615) with a top housing (690) and a bottom housing (695) mounted over the top side (610) and bottom side (620) of the printed circuit board (615) and covering the top and bottom opening of a through hole (630). The top housing (690) and bottom housing (695) have an interior surface with conductive material plated on the quadrants of the interior surface. The top housing (690) and bottom housing (695) are mounted at a circumference around the through hole (630) covering each plated conductive trace areas (only (640), (645) are shown) on each side of the printed circuit board (615) in a manner that aligns the conductive trace areas of the printed circuit board with the conductive trace areas on the interior surface of each housing. Each housing (690) and (695) is mounted in a manner that allows electrical isolation of each housing from the top plated area (675), on the upper interior surface of the through hole (630), and further allows electrical isolation from the bottom plated area (650) of the bottom interior surface of the through hole (630). The top housing (690) and bottom housing (695) are mounted to the printed circuit board (615) over the plated conducted trace areas (640), (645) using two prongs (655), each prong (655) extending from the peripheral edge of the top housing (690) and bottom housing (695) respectively, and are inserted into the body of the printed circuit board (615) through insertion holes (660) for attachment or solder on both sides of the printed circuit board.

An electrically conductive trace (611) extends from the top plated conductive trace area (640) on the top side (610) of the printed circuit board (615). A second trace (710) extends from the bottom plated conductive trace area (645) on the bottom side (620) of the printed circuit board (615). A third trace (600) extends from the upper interior through hole plated surface area (675), and a forth trace (715) extends from the lower interior through hole plated surface area (650). Each trace (600), (611), (715), and (710), extend to a micro controller (not shown).

An electrically conductive sphere (670), such as a steel or copper ball, is enclosed within the cavity (680) contained within the through hole (630) and between the top housing (690) and bottom housing (695). It will be understood by one skilled in the art that any electrically conductive sphere (670) may be used and it does not have to be a steel ball, but can be made of any material capable of conducting an electrical charge. The current embodiment contemplates a standard size copper ball (1/16" diameter). The conductive sphere (670) is of a size such that it freely moves across the through hole (630) and between the top housing (690) and bottom housing (695), and can occupy any space within the cavity (680) depending on the motion vectors exerted on the motion sensor.

It is preferable that all component of the present motion sensor that are in contact with the interior cavity (680) are covered with gold plating or other non-oxidizing material to prevent a build up over time of oxidation on the components. The gold plating prevents oxidation and extends the life and sensitivity of the sensor over time. Additionally, the entire motion sensor assembly may be sealed with a special high viscosity sealant to prevent contaminates from entering any gaps.

In this preferred embodiment, when motion is exerted on the printed circuit board, such as in a vertical plane, moving the conductive ball (670) within the cavity (680) is in the direction opposite of the vector of motion. When the conductive ball (670) comes into contact with the conductive surface of one of the quadrants of either the top housing (690) and the upper conductive plated area (675) of the upper interior surface of the through hole (630) a circuit is closes and opened along the trace leads (600) and (611) associated with the quadrant opposite of the movement, sending a signal to the micro controller (not shown) indicative quadrant where the contact is closed and the direction of movement. The micro controller includes software that evaluate the electrical inputs received from each of the traces (600), (611), (710), and (715) to evaluate the motion vector of the sensor. An active electronic circuit detects these transitional currents and uses them to trigger other electronic subsystems used for many different motion sensing applications.

The primary use is intended for a key fob motion sensor. The motion sensor is activated by the user when moving (walking, running, etc.), it will automatically enable an RF transmission. This motion triggered RF transmission mechanism is part of a passive keyless entry system for a car alarm application. Other uses could be a shock sensor for car alarm systems, vibrations sensor in machinery, position sensing, etc. In a shock sensor application, a suspension such as a small stiff spring or column can be formed to fit under the top and bottom housing and in contact with a trace. When there is an impact or shock, the spring is compressed proportionately to the intensity of the impact or the column sways with motion proportionate to the impact and makes contact with the housing in different locations, allowing for a determination of shock intensity.

We claim:

1. A motion sensor comprising;
    a printed circuit board with a through hole, said through hole having a cavity with a first opening and a second opening and an electrically conductive interior surface;
    a first housing member and a second housing member, said first and second housing members comprised of electrically conductive material and enclosing said first opening and said second opening of said printed circuit board through hole cavity;
    a first electrically conductive element in association with said printed circuit board, said first electrically conductive element located at circumference surrounding said printed circuit board through hole, whereby said first housing member and said second housing member is mounted on said first electrically conductive element; and
    a second spherical shaped electrically conductive element, said second spherical shaped electrically conductive element located within a space consisting of said through hole cavity enclosed by said first housing and said second housing, said second spherical shaped electrically conductive element capable of three dimensional movement within said space, and further capable of closing an electrical circuit when in contact with said through hole electrically conductive interior surface and said first housing or said second housing, and wherein closing of said electrical circuit triggers a signal indicative of motion.

2. The motion sensor of claim 1, whereby said through hole interior surface is in association with a lead, said lead is associated with micro controller and communicates a directional signal indicative of the motion of said motion sensor when said electrical circuit is closed.

3. The motion sensor of claim 1, whereby said first electrically conductive element is in association with plurality of leads, said plurality of leads are distributed at different location around said first conductive element and communicates a directional signal indicative of the motion of said motion sensor when said electrical circuit is closed between said through hole interior surface and said first housing or said second housing.

4. A motion sensor capable of detecting motion in three dimensions comprising;
    (a) a printed circuit board with a first side and a second side, and with a through hole extending through said first and second side, said through hole having a cavity with a first opening and a second opening, said cavity further having a first electrically conductive interior surface in association with a first electrically conductive trace, a second electrically conductive interior surface in association with a second electrically conductive trace, and an electrically insulated surface between said first and second electrically conductive interior surface;
    (b) a first housing member and a second housing member, said first and second housing members comprised of electrically non-conductive material and mounted on said first side and said second side of said printed circuit board to enclose said first opening and said second opening of said through hole cavity, the interior surface of said first and second housing members also having electrically conductive traces along a plurality of radial extension;
    (c) a plurality of electrically conductive elements in association with said printed circuit board first side and second side, said plurality of electrically conductive element located at a circumference surrounding said through hole, whereby said plurality of electrically conducted traced of said first housing member and said second housing member is mounted on said first side and said second side of said printed circuit board in contact with said plurality of electrically conductive element; and
    (d) a spherical shaped electrically conductive element, said spherical shaped electrically conductive element located within a space consisting of said through hole cavity enclosed by said first housing and said second housing, said spherical shaped electrically conductive element capable of three dimensional movement within said space, and further capable of closing a plurality of electrical circuit when in contact with said first or second through hole electrically conductive interior surface and said plurality of traces located on the interior surface of said first housing or said second housing, and wherein closing of said plurality of electrical circuit triggers a signal indicative of the direction of motion.

5. The motion sensor of claim 4 wherein where said plurality of electrically conductive element are in contact with a plurality of leads.

6. The motion sensor of claim 5 further comprising a microprocessor, said microprocessor associated with said plurality of leads and capable of receiving and processing signals from said plurality of leads to calculate the direction of motion of said motion sensor, said microprocessor further capable of sending an output indicative of the directional motion of said motion sensor.

* * * * *